United States Patent [19]

Gill et al.

[11] 3,896,867
[45] July 29, 1975

[54] FASTENER FOR PANELS
[75] Inventors: Peter John Gill; Dennis Joseph O'Donnell, both of Walsall, England
[73] Assignee: G.K.N. Screws & Fasteners Limited, England
[22] Filed: June 8, 1973
[21] Appl. No.: 368,317

[30] Foreign Application Priority Data
June 8, 1972 United Kingdom............... 26711/72

[52] U.S. Cl.................................. 151/69; 151/21 B
[51] Int. Cl........................ F16b 39/286; F16b 43/00
[58] Field of Search .... 151/41.75, 69, 41.72, 41.74, 151/41.73, 21 R, 21 B, 21 C; 85/80

[56] References Cited
UNITED STATES PATENTS
3,037,542   6/1962   Boyd.............................. 151/69 X
3,177,916   4/1965   Rosan............................. 151/41.73
3,217,774   11/1965  Pelochino....................... 151/69
3,232,088   1/1966   Newcomer et al............. 151/69 X
3,298,270   1/1967   Launay.......................... 85/50 R X
3,476,165   11/1969  Vaughn.......................... 151/69 X
3,765,465   10/1973  Gulistan........................ 151/69

FOREIGN PATENTS OR APPLICATIONS
845,152   8/1960   United Kingdom............. 151/41.75

Primary Examiner—Ramon S. Britts
Attorney, Agent, or Firm—Spencer & Kaye

[57] ABSTRACT

A quick release fastener comprising a stud sub-assembly having a bearing washer and retaining washer to hold the stud captive in a panel and a nut sub-assembly comprising a split resilient nut sleeve captive in a yoke which is secured to a sheet to which the panel is to be attached.

2 Claims, 8 Drawing Figures

PATENTED JUL 29 1975 3,896,867

SHEET 1

PATENTED JUL 29 1975 3,896,867

SHEET 3

FASTENER FOR PANELS

BACKGROUND OF THE INVENTION

1. Field of the Invention

This invention relates to a special type of quick operating fastener used for securing panels in position and especially inspection panels in aircraft where one of the essential requirements is that the fastener shall be capable of very rapid operation, both for securing the inspection panel and for releasing it, so that the operation of taking off an inspection panel and putting it back on can be performed in the minimum of time.

This type of fastener comprises two separate sub assemblies, one of which includes an externally threaded stud and the other of which includes a nut, the stud being captively mounted in the removable panel and the nut being captively mounted in the structure to which the panel is applied. Such fasteners are hereinafter referred to as being "the type referred to." Generally in aircraft the panel and surrounding structure are of sheet metal but the fastener is capable of use with other panels and structures which are of sheet material other than metal.

For the aircraft industry this type of fastener is subject to certain rigid standard requirements of which the following dictate to some extent the constructional features of the two sub assemblies. Each sub assembly must be attached to the panel or surrounding structure as the case may be in such a manner that it cannot become inadvertently detached therefrom and further the parts of each sub assembly must be assembled so that in operation no part of a sub assembly can become inadvertently separated from the other parts. The nut sub assembly must be such that the nut is held captive in a "floating" manner and the threaded engagement between the stud and nut must be such that from the point of first engagement of the threaded parts the stud can be tightened up with no more than about two or three complete turns. In practice this requirement means that a multi-start thread of high helix angle must be used and because of this particular thread engagement, in order to provide against the possibility of the stud and nut becoming disengaged, the nut must be a selflocking prevailing torque or "stiff" nut in order to provide extra frictional grip upon the thread of the stud.

2. Description of the prior art

Such prior art fasteners as have been provided to meet these stringent requirements have been very expensive, primarily due to the relatively large number of parts used in each of the sub assemblies in order to meet these requirements. In one typical example of such prior art fastener the stud sub assembly comprises two separate parts and the nut sub assembly comprises six separate parts and a number of manufacturing operations, involving use of tools, such as staking, riveting and dowelling are required to build up the sub assemblies. The manufacture and assembly of this large number of separate parts to make up the two sub assemblies means that such fastener is extremely expensive and the cost thereof is much greater than the cost of the two basic elements, namely the stud and the nut.

SUMMARY OF THE INVENTION

It is the object of the present invention to provide a much simplified form of fastener of this type and one which will be lightweight and will meet the standard requirements of the aircraft industry but wherein the cost of production and assembly will be considerably less than hitherto and such cost will not be very much greater than the cost of the two basic elements, namely the stud and the nut.

According to the invention there is provided a fastener of the type referred to for connecting together two members in face-to-face relationship and wherein the nut assembly comprises an internally threaded sleeve having at one end a radially extending noncircular flange, and a slit through the wall of the sleeve running from the other end thereof at least part of the way from end to end of the sleeve, the yoke having a pair of spaced apart attachment lugs for securing it to one of the two members and an opening which loosely receives the flange on the sleeve so that the flange will be trapped between the yoke and said one member and the sleeve may be brought into axial alignment with a hole in said one member when the yoke is attached thereto; and the stud sub assembly comprises an externally threaded shank having a head at one end, and on its shank a retaining washer and means to prevent the retaining washer from becoming separated from the shank.

The stud sub assembly may have a thick plain cylindrical portion between the head and the threaded shank to reduce risk of shearing the stud under loading.

The yoke may have a pair of spaced parallel flanges extending from opposite sides of said hole in the yoke, in directions away from the attachment lugs, arranged so that the nut sleeve may pass between the flanges and there being means on the end of the sleeve remote from the flange of the nut to retain the nut captive in relation to the yoke.

The stud assembly may include a bearing washer under the head and the retaining washer may be a resilient split ring washer which can be forcibly slid over the threads on the shank, the shank having a portion near the end which is remote from the head which is of less diameter than the thread major diameter and into which the split ring member will close.

BRIEF DESCRIPTION OF THE DRAWINGS

Certain embodiments of the invention are hereinafter described by way of example and with reference to the accompanying drawings wherein.

DESCRIPTION OF PREFERRED EMBODIMENTS

Figure 3:
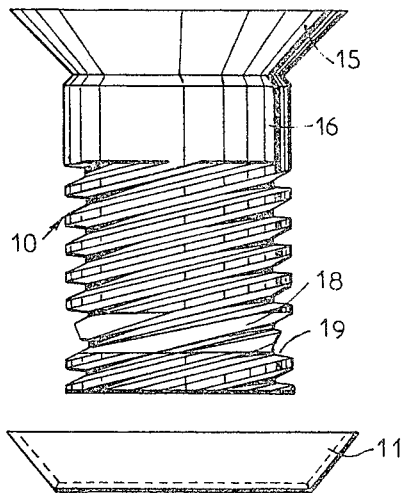
FIG. 3 is a view in side elevation of the stud sub assembly.
Figure 4:
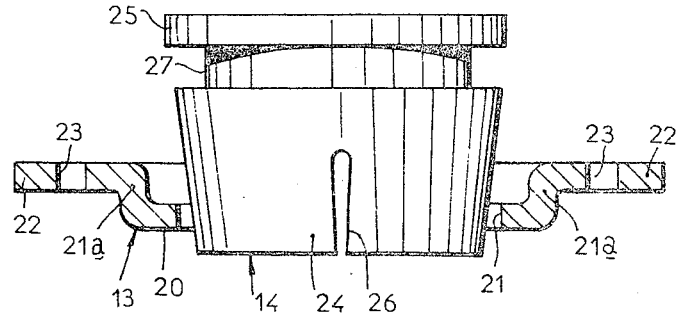
FIG. 4 is a view in side elevation of the nut sub assembly.

Referring first to FIGS. 3 and 4, the stud sub assembly consists of the stud 10 with externally threaded shank, bearing washer 11 and a resilient split ring retaining washer 12 whilst the nut sub assembly consists of the yoke 13 and nut 14.

The stud 10 has a countersunk head 15 with a thick plain cylindrical portion 16 immediately below the head which reduces the risk of shearing the stud under loading. The bearing washer 11 is of frusto-conical form to conform to the underside of the countersunk head 15. The head 15 is provided with a suitable slot or recess for the reception of a screwdriver bit, and preferably a cruciform type of recess is provided, as indicated at 17 in FIG. 2.

From the plain cylindrical part 16 the remainder of the shank of the stud is provided with a multi-start thread of trapezoidal form of which a small portion 18, spaced a short distance from the end of the shank, gradually reduces in height so as to provide a radially extending shoulder 19 facing towards the head 15 of the stud. The split resilient retaining washer 12 is mounted upon the shank of the stud between the shoulder 19 and the underside of the head 15 and is prevented from coming off the free end of the shank by engagement with the shoulder 19 when it closes into the reduced portion 18. This retaining washer 12 can move between the shoulder 19 and the underside of the head 15 by being forcibly slid over the thread and this is the reason for having a thread of trapezoidal form which provides crests having a substantially flat form. It is preferred to make the crests of the threads somewhat wider than in a normal trapezoidal thread so that the area of cross section of thread is increased and the area of cross section of trough is correspondingly reduced. This provides for more area of contact between the thread and the resilient split retaining washer when it is being moved from one end of the shank to the other and thus facilitates this movement of the retaining washer.

Referring now to FIG. 4, the nut sub assembly consists of the yoke 13 which is a channel section piece of metal strip having a base 20 provided with a circular hole 21 and along each edge an attachment lug 22, each lug 22 having therein an aperture 23. The base 20 is connected to the lugs 22 by the spaced parallel flanges 21a which extend from the lugs.

Figure 2:
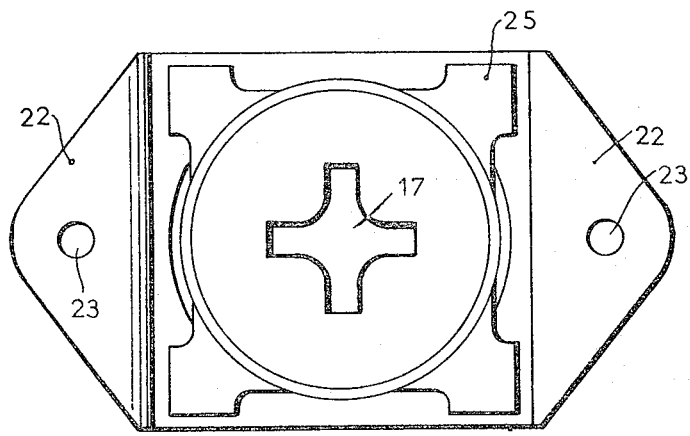
FIG. 2 is a plan view of the fastener but not showing the panel and sheet of FIG. 1.

The nut 14 comprises a generally cylindrical internally threaded sleeve 24 having at its one end a flange 25 which, as shown in FIG. 2, is generally of square form and has a maximum transverse dimension which is greater than the diameter of the hole 21 so that when the nut is inserted through the hole 21, as shown in FIG. 4, the flange 25 cannot pass therethrough.

The wall of the sleeve 24 is provided with a number, preferably four, of diametrically opposed slits 26 which extend from the one end of the sleeve inwardly towards the flange 25 in a direction parallel to the axis of the sleeve. The end of the sleeve remote from the flange 25 is closed in a slight amount so as to give the resilience to this end of the sleeve which is required to provide the stiff feature in the nut.

Also, as shown in FIG. 4, the exterior of the sleeve 24 is tapered so that at the end remote from the flange 25 it is of smaller diameter and at a position closer to, but spaced from, the flange 25 is of larger diameter and providing a groove 27 between its larger diameter part and the flange 25. The nut and yoke are assembled together to provide the nut sub assembly by passing the sleeve between the flanges 21a and springing the sleeve 24 through the circular hole 21 so that the edge of the hole 21 is engaging within the groove 27 and the nut is captively retained in the yoke 13. It will be observed that the diameter of the groove part 27 is substantially less than the diameter of the hole 21 and also that the axial thickness of the flange 25 is slightly less than the depth of the channel section of the yoke 13 so that the nut is held quite loosely in the yoke and thus meets the requirement for being floatingly and captively mounted.

Furthermore, the nut sub assembly satisfies the requirement that the parts cannot become inadvertently separated and also the stud sub assembly satisfies this requirement because when the retaining washer 12 is in position on the shank of the stud the bearing washer 11 is trapped and cannot come off the free end of the stud because of the presence of the retaining washer.

Figure 1:
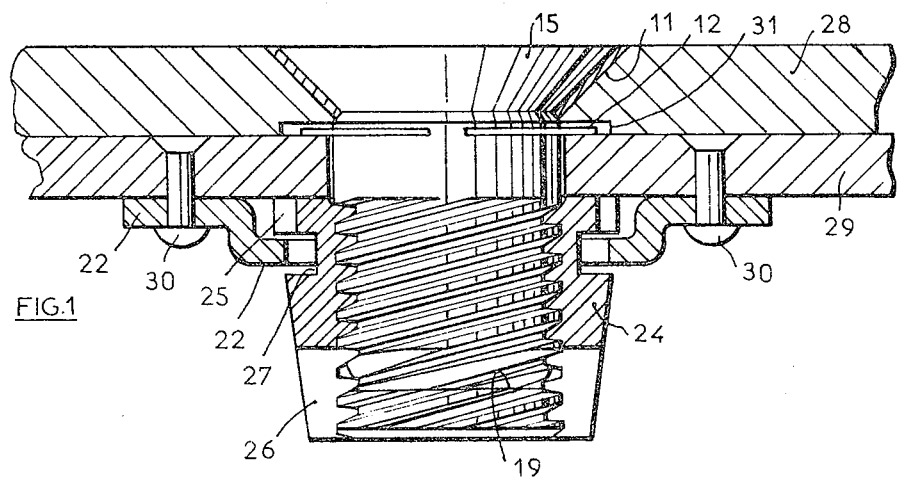
FIG. 1 is a section taken through a completely assembled fastener shown securing a panel to a sheet.

Referring now to FIG. 1, there is shown, in cross section, the fastener in use for securing a panel 28 to a surrounding structure sheet 29, both panel 28 and sheet 29 being formed of sheet metal.

The nut sub assembly is secured to the sheet 29 by means of rivets 30 engaging through the holes 23 in the attachment lugs 22 of the yoke and engaging in the sheet 29 so as to secure the yoke of the nut sub assembly securely to the sheet 29. When the stud is not engaged within the nut the nut can float within its mounting in relation to the sheet 29 so that the sleeve 24 can be brought into axial alignment with the hole in sheet 29.

The hole through the sheet 29 is slightly larger in diameter than the plain part 16 of the stud and the panel 28 is provided with an aperture which is of countersunk form to accommodate the head 15 and bearing washer 11 of the stud assembly and on its inner face has an enlarged counterbore 31 to accommodate the retaining washer 12 when the fastening is tightened up in the position shown in FIG. 1.

When the panel 28 is separated from the sheet 29 the stud sub assembly is retained captively in the panel 28 by virtue of the retaining washer 12 which prevents the shank of the stud from passing completely through the aperture in the panel 28.

Preferably, the thread on the stud is a four start thread but a two (or more) start thread may be used in certain cases.

When the stud is being unscrewed to release the panel 28 the thread thereon passes slidably through the retaining washer 12 until the point of disengagement between the thread of the stud and the internal thread of the nut whereupon the retaining washer 12 held by the shoulder 19 prevents the stud from coming completely out of the panel 28.

It will be observed that the sub assembly for the nut comprises only two parts, and that for the stud comprises only three parts as compared with the substantially greater number of parts for fasteners of this type as hitherto proposed.

Figure 5:
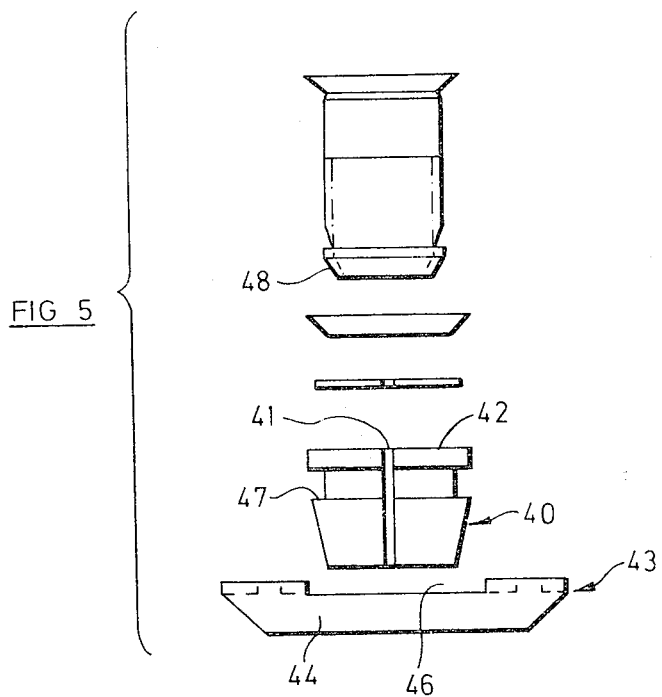
FIG. 5 is an exploded view showing a modified form of fastener.
Figure 6:
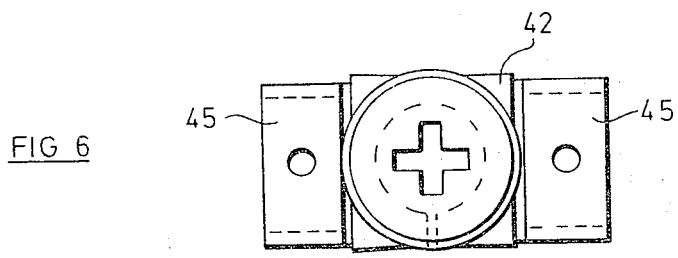
FIG. 6 is a plan view of the fastener of FIG. 5 in the assembled state.

Referring now to FIGS. 5 and 6 in the modified fastener shown therein the stud sub assembly is substantially the same as that described with reference to FIG. 3 but the nut sub assembly is of a different form designed to give a better prevailing torque performance in order that the fastener may be capable of passing the standard test requirements of aircraft specifications.

In this modified form the nut 40 is provided with a single slit 41 which extends completely through the wall of the sleeve and runs from one end of the nut right through to the other end and through the non-circular flange 42 at this end of the nut. This use of a single slit extending completely from end to end of the nut for the "stiff" feature provides for better resilient gripping characteristics than the arrangement of a number of incomplete slits as in the construction of FIG. 4. In the nut shown in FIG. 5, the action of the threaded stud in expanding the nut is a "deflecting beam" action which provides better resilient characteristics in the nut than in the FIG. 4 construction where there is deflection of four relatively short and therefore relatively stiffer wings.

It is also preferred to use a method of manufacture for the nut of FIG. 5 which is different from that of cutting a slit in the body of the sleeve and then closing or squeezing the edges of the slit together. With this method of cutting the slit and closing in there is difficulty in keeping the width of the slit to a minimum consistent with the load deflection properties required of the nut body so that if the slit is made wide to facilitate normal deformation by squeezing in tools after heat treatment it may result in a crude and overly eccentric nut thread formation with the result that there will be excessive wear of the thread surfaces of the stud due to the edges of the slit plowing into the engaging screw thread surfaces of the stud and leading to significant losses in required prevailing torque characteristic.

This drawback may be overcome by a method in which the smallest possible slit (e.g. .030 inch) is made in the sleeve before heat treatment and then each nut is inserted in a mild steel enclosing envelope having a hole therethrough which is just big enough to take the closed nut. The nuts thus enclosed are given the full heat treatment and after heat treatment may be removed quite easily from their envelopes and will remain in the "closed" condition. Also this method offers the possibility of control of the nut deformation and subsequent prevailing torque characteristics that could not be obtained from the other method referred to.

Also in FIG. 5 a modified and somewhat simpler form of yoke is provided designed to give an easier snap engagement between the nut and the yoke when the two parts are being assembled. In this case the yoke 43 is formed as a simple channel section piece with downwardly extending spaced parallel side flanges 44 and attachment lugs 45 at each end of the base and rectangular opening 46 between the attachment lugs and having a longitudinal dimension somewhat in excess of that of the square flange 42 and a depth slightly greater than the depth of the flange 42 so that when the nut is inserted into the yoke the flange 42 is loosely held in the rectangular opening 46 and two opposed edges of the flange 42 rest upon the upper edges of the flanges 44.

As before the frust-conical part of the nut 40 is sprung between the flanges 44 and the shoulder 47 engages under the underneath edges of the flanges 44 so that the nut is retained loosely and captively in the yoke.

The stud is substantially as shown in FIG. 3 with the frust-conical bearing washer and split ring retaining washer. However, the thread 48 at the entry end of the shank is made of tapered form for the following reason.

As the nut has been deformed due to the slit being closed in, a smaller than nominal size threaded aperture is presented to the entry end of the stud when this is first engaged with the nut and unless very heavy axial thrust is applied it is not possible to start to engage the stud with the nut if there is full thread formation on the end of the stud. If heavy axial thrust is used there are problems arising from cross threads and possibility of wear damage to the threads particularly as the nut is floating and may tend to cant sideways under heavy axial thrust. This problem is overcome by the use of the short length 48 of tapered thread for starting purposes and as this thread at the starting end is correspondingly smaller than the thread of the deformed nut there will be no difficulty in achieving thread engagement.

With the fastener of FIGS. 5 and 6 there are only three separate parts in the stud sub-assembly and two separate parts in the nuts assembly and all these parts may be assembled together by simple snap-on or snap-in engagement so that no manufacturing operations involving tools are required for the assembly of the component parts.

Figure 7:
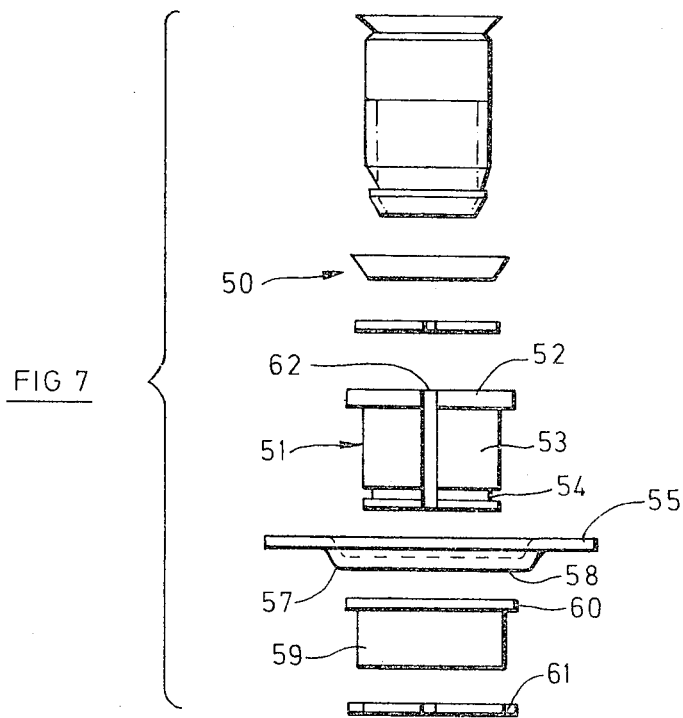
FIG. 7 is an exploded view of a further form of fastener.
Figure 8:
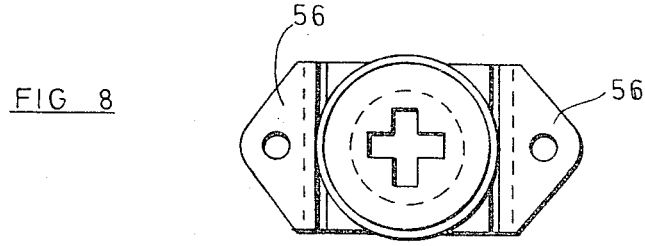
FIG. 8 is a plan view of the fastener of FIG. 7 in the assembled state.

Referring now to the further modified form of fastener shown in FIGS. 7 and 8 the stud sub assembly 50 is the same as for the construction of FIG. 5 but the nut sub assembly has been strengthened in order that the fastener as a whole may satisfy standards with higher strength characteristics than those required for the previously described constructions.

The nut 51 has a square shaped flange 52 at one end as before but with this construction the main body part of the nut is in the form of a cylindrical sleeve 53 with an annular groove 54 near the end remote from the flange 52.

The yoke 55 is similar to the yoke in the construction of FIGS. 1 to 4 and has attachment lugs 56 and a base 57 in which is a circular hole 58 through which the sleeve part 53 of the nut can pass freely and the flange 52 can rest loosely and non-rotatably in the space above the base 57. After the cylindrical part 53 of the nut has been passed through the opening 58 a thrust bush 59 having an internal diameter slightly larger than the external diameter of the sleeve part 53 is placed over the sleeve so that the flange 60 at one end of the bush 59 engages the underside of the base 57 of the yoke, this flange 60 having a larger diameter than the diameter of the hole 58. The sub assembly is then secured by means of the spring retaining washer 61 which is sprung into the groove 54 in the one end of the nut.

As with the previously described construction the nut has a slit 62 extending through its wall and going completely from one end to the other of the nut but the presence of the thrust bush 59 limits the extent of deflection of the nut wall when the stud is engaged therewith and considerably improves the strength characteristics of the nut. As compared with the previously described constructions the nut sub-assembly has only two extra parts all of which can be assembled without any manufacturing operation being required. However, the spring retaining washer 61 and groove 54 can be eliminated if in the assembly of the parts the end of the cylindrical sleeve 53 is peened over to retain the thrust bush 59 in place and this would only entail one simple manufacturing operation in the assembly of the parts.

In each embodiment shown, the stud has a plain cylindrical portion adjacent the head thereof, this portion having a diameter equal to, or greater than the major diameter of the thread form. This thick cylindrical portion is intended to make the stud sub assembly resistant to shear forces exerted thereon in use.

We claim:
1. A quick operating fastener for securing two panels in face to face relationship comprising a stud sub-assembly for captive mounting on one panel, and a complementary nut sub-assembly for captive mounting on the other panel, wherein said nut sub-assembly comprises:

a yoke having a pair of spaced apart attachment lugs for securing it to such other panel, and a part extending between said lugs and having an opening therethrough bounded by a pair of opposed flanges; and an internally threaded sleeve having at one end a radially extending noncircular flange with a transverse dimension greater than the spacing between said opposed flanges of said yoke, the wall of said sleeve being provided with at least one slit extending from the other end thereof at least part of the way to the one end thereof, said sleeve having a reduced internal diameter at the other end thereof to cause said sleeve to act as a self-locking nut, said sleeve being provided with a cylindrical groove adjacent said noncircular flange and defining an annular shoulder facing toward said noncircular flange and having a diameter greater than that of said opening;

said sleeve being retained captive in said yoke with said annular shoulder and said noncircular flange engaging loosely on opposite sides of said opening, the outer surface of said sleeve, adjacent said annular shoulder, being tapered inwardly away from said annular shoulder to permit said sleeve to be sprung through said opening, and said noncircular flange being prevented from rotation by virtue of its engagement between said attachment lugs;

and said stud sub-assembly comprises:

an externally threaded shank having a head at one end and provided with a multi-start thread of high helix angle and of trapezoidal form extending to the other end of said shank, said thread having a reduced portion close to, but spaced from, said other end of said shank, said reduced portion having a diameter less than the thread major diameter and tapering inwardly away from said head, with said shank presenting an abutment shoulder bordering the smaller diameter end of said reduced portion and extending radially outwardly therefrom; and a resilient spring retaining washer on said stud shank between said head and said abutment shoulder, the inner diameter of said washer in its untensioned state, being less than the diameter of said abutment shoulder, whereby said washer can close into said reduced portion of said shank and retain said stud in place in a hole in the one panel.

2. A quick operating fastener according to claim 1 wherein the sleeve is of cylindrical form having a single slit extending axially for the whole of its length and through its flange.

* * * * *

UNITED STATES PATENT OFFICE
CERTIFICATE OF CORRECTION

PATENT NO. : 3,896,867
DATED : July 29th, 1975
INVENTOR(S) : Peter John Gill et al It is certified that error appears in the above-identified patent and that said Letters Patent are hereby corrected as shown below:

In the heading of the patent, under [75] Inventors:, change the listing of the inventors to read: --Peter John Gill of Codsall, England; Dennis Joseph O'Donnell of Bentley, England--;

Signed and Sealed this twenty-fourth Day of February 1976

[SEAL]

Attest:

RUTH C. MASON
Attesting Officer

C. MARSHALL DANN
Commissioner of Patents and Trademarks